Nov. 4, 1958 S. H. HERSH 2,859,317

PHOTODETECTORS

Filed Aug. 26, 1955

*INVENTOR*
SIDNEY H. HERSH

BY

Howard White ATTORNEYS

United States Patent Office 2,859,317

Patented Nov. 4, 1958

2,859,317

PHOTODETECTORS

Sidney H. Hersh, Washington, D. C.

Application August 26, 1955, Serial No. 530,917

6 Claims. (Cl. 201—63)

(Granted under Title 35, U. S. Code (1952), sec. 266)

The invention described herein may be manufactured and used by or for the Government of the United States of America for governmental purposes without the payment of any royalties thereon or therefor.

The present invention relates to a sensitized crystalline photodetector.

For the purpose of the present disclosure, a photosensitive crystalline detector is taken as a material having electrical resistance, or reactance, or both, which vary in accordance with the intensity of radiation to which the material is exposed.

Electrical resistance and electrical reactance, either inductive or capacity reactance, or both, are the characteristics of electrical conductors which tend to prevent or impede the flow of electrical current therethrough under the influence of an electromotive force. The combined current flow resistive effect of resistance and reactance, in a given conductive material is commonly referred to as the electrical impedance of the material.

The photodetector of the present invention employs a pair of crystalline portions having mating, affronting faces. Preferably these faces are formed by breaking a single crystal. The crystal may be broken after tegmenting, as by potting with plastic, so the tegment retains the faces in proper relation. The photodetector is sensitized by electrical treatment to render the interface photoconductive. The physical basis of the resulting photosensitivity is not understood.

The ability of the crystal interface to alter its impedance in response to the light rays incident thereon, makes the crystal a good light detector that may be used for actuating relays for triggering devices or doing desired work operations when connected in a suitable electrical system, in response to light ray induced changes in the impedance of the connected semi-conductor.

It is an object of this invention to provide a very sensitive photodetector.

A further object of this invention is to provide a photodetector having a sensitized mated crystal interface.

Another object of this invention is to provide a low impedance cadmium sulphide photodetector.

Other and more specific objects of this invention will become apparent upon a careful consideration of the following detailed description when taken together with the accompanying drawings, in which.

Figures 1, 2:
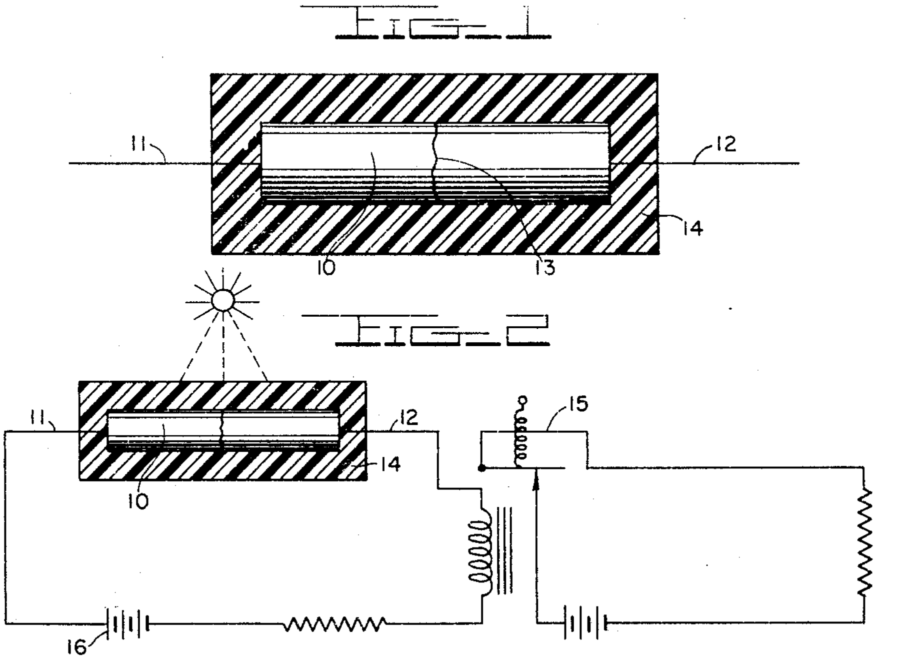
Fig. 1 illustrates a fractured crystal enclosed in an optically clear plastic.
Fig. 2 is a diagrammatic showing of the photodetector for light ray detecting purposes.

Referring now to the drawings, Fig. 1 illustrates a fractured crystal 10 with electrodes 11 and 12 secured thereto. The crystal and electrodes are held in position by a radiation transparent and preferably optically clear plastic block 14 which sets up at atmospheric pressure and room temperature and can be positioned in any desired location whereby the crystal will receive a desired incident light source. The fractured crystal in the absence of incident light rays has an impedance of high order which constitutes the material as a good insulator capable of preventing the flow of electrical current. Light rays incident on the fracture of the crystal tends to make the crystal electrically conductive in proportion to the intensity of the rays incident thereon.

Fig. 2 illustrates a diagrammatic circuit including the crystal 10 which operates a control unit 15 by allowing current to flow through a circuit having an applied direct current voltage source 16. The control unit may be a relay for operating devices, it may be used to control the grid of an amplifying tube or to do desired work function when connected in a suitable electrical system or it could be an ohmmeter to register current flow through the system.

Operating characteristics illustrating the effectiveness of a fractured low impedance cadmium sulphide crystal as a light detector is shown below. Incandescent light was used as the incident light, and current readings were taken for applied direct current voltages between 0 and 10 volts.

*Applied voltage vs. micro-amps. per foot candles*

| Volts | Foot Candles | | | |
|---|---|---|---|---|
| | 1 | 2.5 | 5 | 10 |
| 0 | 0 | 0 | 0 | 0 |
| .5 | 35.1 | 52.9 | 68 3 | 83.8 |
| 1.0 | 76.7 | 125 | 165 | 203 |
| 1.5 | 125 | 200 | 275 | 343 |
| 2.0 | 172 | 281 | 388 | 499 |
| 2.5 | 220 | 368 | 510 | 660 |
| 3.0 | 272 | 455 | 643 | 833 |
| 3.5 | 327 | 549 | 780 | 1,090 |
| 4.0 | 382 | 645 | 922 | 1,300 |
| 4.5 | 435 | 743 | 1,112 | 1,500 |
| 5.0 | 491 | 848 | 1,290 | 1,730 |
| 6.0 | 607 | 1,080 | 1,600 | 2,200 |
| 7.0 | 713 | 1,300 | 1,920 | 2,980 |
| 8.0 | 830 | 1,500 | 2,270 | 3,120 |
| 9.0 | 950 | 1,720 | 2,600 | 3,600 |
| 10.0 | 1,100 | 1,950 | 2,930 | 4,040 |

It is obvious from the above data that a relatively high current flows through the photodetector for a small applied voltage and it affords highly sensitive photodetection.

It is convenient to fracture a crystal for the purposes of the present invention within a covering or sheath that retains its integrity during the operation and is sufficiently strong to maintain the mating crystal faces in alignment after fracture.

The fracture may be obtained, for instance, mechanically or thermally. Where a plastic that sets at room temperature is used, such as "Paraplex P–43" manufactured by Rohm and Haas Co., the potted crystal may be flexed before the final plastic set has occurred, and the tegment is still flexible. On the other hand, a thermosetting plastic may be used in which fracture occurs during the thermal cycle. The above named plastic can be gently thermoset to obtain fracture of an embedded detector element.

In the temperature method, the single crystal is potted in an optically clear plastic in a mold. After the plastic sets up, the mold is placed in an oven and heated for 8 hours at a temperature between 55 and 60 degrees centigrade. During the heating process the plastic becomes pliable and after the heat is turned off and the potted crystal is left to cool, the plastic cools around the crystal and on hardening and contracting, the plastic fractures the crystal. When the temperature lowers to room temperature the mold is removed from the oven and checked with an ohmmeter across the electrode, a high resistance reading indicates the fracture has taken place. The potted crystal is then removed from the mold and may be sensitized.

Figure 3:
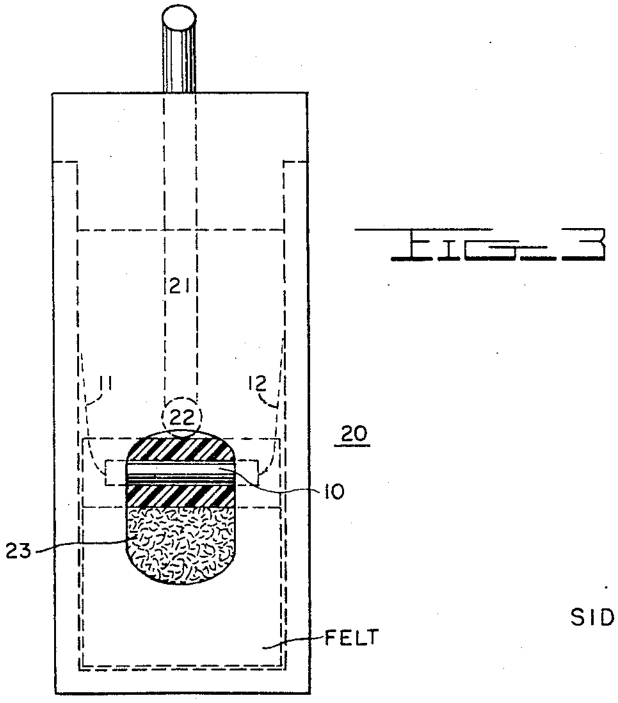
Fig. 3 is a mechanical device used to fracture a crystal.

A mechanical method of fracturing the crystal makes use of a jig 20 shown in Fig. 3 having a felt lined base and a press 21 which has a steel ball 22 on the end. The crystal is molded in a plastic and allowed to set at room temperature. The plastic comprising the crystal is removed from the mold and placed centrally into the jig above the felt lining in a position whereby the steel ball will be positioned directly above the longitudinal length of the crystal. The press is forced slowly downwardly against the molded plastic, bowing the crystal, which after being bowed far enough, the crystal will fracture and remain positioned with mating, affronting faces. The fracture causes an open circuit characteristic which can be detected by connecting an ohmmeter across the electrodes.

A window 23 is made in the side of the jig for visual inspection to denote when the crystal has been fractured.

After the crystal has been mechanically fractured the plastic including the fractured crystal may be placed back into the mold and then placed into an oven and gently heat treated similarly to the heat treatment method above disclosed for fracturing the crystal. It is not necessary to heat treat after mechanically fracturing but the heat treatment offers advantages in removing impurities, moisture or air bubbles which may be in the plastic.

Before sensitization, the crystal interfaces present open circuit characteristics. The assembly is rendered photoconductive by breaking down the gap by application of direct current potentials, for limited times, above the final operating voltage range.

Cadmium sulphide crystals normally used in photodetectors are high impedance crystals. Conventional manufacturing methods produce crystals of both high and low impedance. Low impedance cadmium sulphide crystals, after fracture, yield unusual sensitivity, and their sensitization will be described as illustrative.

The crystal is irradiated during the process at a convenient intensity such as 100 foot candles (tungsten). A moderate voltage such as 50 bolts is applied for about a minute, during which the current will be a minor fraction of a milliampere. For about 30 seconds a higher voltage is then applied at a potential which produces an intermittent breakdown with current extending to full scale deflection on a d'Arsonval 1 milliampere movement. This occurs typically at a 70 volt potential.

The voltage is then increased to effect conduction at or above the 1 milliampere level for 10 seconds. Thereafter, the detector is tested at one half to one volt where it should pass one milliampere under the existing light flux. If this sensitivity is not attained, the crystal may be again pulsed for a second at 90 to 100 volts until the desired result occurs.

The photodetectors of the present invention are highly sensitive, stable devices of wide application in technological fields.

Obviously many modifications and variations of the present invention are possible in the light of the above teachings. It is therefore to be understood that within the scope of the appended claims the invention may be practiced otherwise than as specifically described.

What is claimed is:

1. A photodetector comprising a substantially non-photosensitive crystalline element, a pair of spaced electrodes on the element, a photosensitive fracture through an entire cross section of the element lying between the electrodes, and means maintaining the faces of the fracture in affronting relation.

2. A photodetector comprising a pair of like crystalline portions with topograpically mating surfaces, means affronting said surfaces in mating photosensitive relationship, and means for electrically contacting the several portions.

3. A photodetector comprising a tegmented cadmium sulphide crystal, a photosensitive fracture through an entire cross section of said crystal, and means for electrically contacting the several portions of the crystal.

4. A photodetector comprising a tegmented low impedance cadmium sulphide crystal, a photosensitive fracture through an entire cross section of said crystal, and means for electrically contacting the several portions of the crystal.

5. A cadmium sulphide crystal element having a complete fracture through an entire cross section thereof, means maintaining the fracture faces in affronting relationship, and means for electrically contacting the element on opposite sides of the fracture.

6. A photodetector comprising a pair of cadmium sulphide crystals with topographically mating surfaces, means affronting said surfaces in mating photosensitive relationship, and means for electrically contacting the crystals.

References Cited in the file of this patent

UNITED STATES PATENTS

| | | |
|---|---|---|
| 2,183,256 | Gabler | Dec. 12, 1939 |
| 2,668,867 | Ekstein | Feb. 9, 1954 |
| 2,678,401 | Jaeger | May 11, 1954 |
| 2,711,464 | Anderson et al. | June 21, 1955 |
| 2,740,875 | Inman | Apr. 3, 1956 |
| 2,810,052 | Bube et al. | Oct. 15, 1957 |